United States Patent [19]

Brady

[11] Patent Number: 5,692,112
[45] Date of Patent: Nov. 25, 1997

[54] METHOD AND APPARATUS FOR BUFFERING DATA BETWEEN A RASTER IMAGE PROCESSOR (RIP) AND AN OUTPUT DEVICE

[75] Inventor: Thomas P. Brady, Methuen, Mass.

[73] Assignee: Agfa Division, Bayer Corporation, Wilmington, Mass.

[21] Appl. No.: 534,904

[22] Filed: Sep. 28, 1995

[51] Int. Cl.[6] .................................................. G06K 15/00
[52] U.S. Cl. ............................................. 395/115; 395/508
[58] Field of Search ........................... 395/112, 115–116, 395/162, 163, 164, 113, 101, 501, 502, 503, 505, 506, 507, 508, 509, 510, 520, 521, 522, 523, 524–526, 414, 418, 419

[56] References Cited

U.S. PATENT DOCUMENTS 4,949,280  8/1990  Littlefield ................................ 395/163
5,274,761  12/1993  Davidson et al. ...................... 395/164

*Primary Examiner*—Arthur G. Evans
*Attorney, Agent, or Firm*—John A. Merecki

[57] ABSTRACT

A method and apparatus for providing data buffering through a plurality of storage buffers between at least one raster image processor (RIP) and at least one output device in an imaging system. The imaging data being produced by a RIP and stored on a first storage buffer is redirected to a second storage buffer if an output divide requires imaging data previously stored on the first storage buffer. After the required imaging data has been output to the output device, the imaging data segmented across the first and second storage buffers is reconstituted.

21 Claims, 7 Drawing Sheets

METHOD AND APPARATUS FOR BUFFERING DATA BETWEEN A RASTER IMAGE PROCESSOR (RIP) AND AN OUTPUT DEVICE

FIELD OF THE INVENTION

The present invention relates in general to imaging systems. More particularly, the present invention is directed to a method and apparatus for providing data buffering between at least one raster image processor (RIP) and at least one output device such as an imagesetter, platemaker, digital proofer, digital color printer or the like. Of course, as should be apparent from the following discussion, any application involving the production and consumption of large parcels of data could take advantage of the method and apparatus of the present invention.

BACKGROUND OF THE INVENTION

As is known in the art of electronic prepress systems, output devices such as laser imagesetters require a steady supply of imaging data to operate efficiently. Unfortunately, the RIP(s) which provide the imaging data to the imagesetter generally operate in a bursty manner which may leave the imagesetter starved for imaging data or the RIP(s) waiting for the imagesetter to use previously available imaging data.

Recently, several data buffering systems have been developed to address this concern. One such system is disclosed in U.S. Pat. No. 5,274,761, incorporated herein by reference. In this system, an imagesetter consumes imaging data, provided by a single RIP, from a pair of storage devices in an alternating manner. Although this data buffering system increases data throughput between the RIP and the imagesetter to a limited degree, the imagesetter and RIP may be forced to remain idle for extended periods of time, thereby wasting valuable processing time. For example, if the imagesetter has fully consumed the imaging data stored in a first one of the storage devices, it must wait for the RIP to finish writing additional imaging data into the second storage device before resuming operation. Similarly, the RIP is prevented from writing imaging data into a given one of the storage devices while the imagesetter is consuming data from that storage device.

SUMMARY OF THE INVENTION

In order to overcome the disadvantages of the prior art, the present invention provides a multiplexing system for efficiently buffering data between at least one RIP and at least one output device in an imaging system. Advantageously, the multiplexing system of the present invention allows the RIP(s) to produce high volumes of imaging data with minimal interruptions while the output device(s) consume previously generated imaging data in a substantially continuous manner.

In the multiplexing system of the present invention, at least two storage buffers are used in conjunction with each RIP to transfer imaging data from the RIP to an output device in such a way that the RIPs and output devices of the imaging system are kept busy producing and consuming imaging data, respectively. A novel data buffering process, described in greater detail below, is used to ensure optimal data transfer between a given RIP and output device using the plurality of storage buffers. In the following discussion, the data buffering process is implemented using a plurality of discrete storage buffers. However, a single storage buffer which allows simultaneous read/write operations may be used in lieu of the plurality of discrete storage buffers to transfer data from each RIP to a selected output device without departing from the scope of the present invention.

When imaging data, herein after referred to as an INPUT TAKE, is available from a RIP, the RIP notifies a MUX controller that an INPUT TAKE is now available for output. Upon receiving a notification of an available INPUT TAKE, the MUX controller allocates a block of memory in an idle one of the pair of storage buffers (i.e., one not being accessed by an output device or by another RIP) for the storage of the INPUT TAKE. The RIP is then directed by the MUX controller to send and store the INPUT TAKE in the designated area of the idle storage buffer. When the output device becomes available and a complete INPUT TAKE is available for output (i.e., as an OUTPUT TAKE) from one of the storage buffers, the MUX controller directs the OUTPUT TAKE to the output device for processing. If the storage buffer containing the OUTPUT TAKE is idle, the OUTPUT TAKE is simply transferred to the output device without interruption. If, however, a RIP is storing a subsequent INPUT TAKE$_{sub}$ onto the storage buffer containing the required OUTPUT TAKE, the RIP is prevented from competing for that storage buffer. This is achieved by segmenting INPUT TAKE$_{sub}$ across two storage buffers, wherein a first segment of INPUT TAKE$_{sub}$ is stored in one storage buffer and the second, remaining segment of INPUT TAKE$_{sub}$ is stored in a second storage buffer.

During the initiation of a segmentation process, the MUX controller finds an idle storage buffer that is available for data storage. Thereafter, the MUX controller allocates a block of memory of sufficient size in the idle storage buffer and directs the RIP to store the second, remaining segment of INPUT TAKE$_{sub}$ therein. Preferably, this data is stored in the idle storage buffer beginning at the same offset address at which data storage terminated prior to the segmentation of the INPUT TAKE. At this point in the segmentation process, the output device has sole access to the storage buffer containing the OUTPUT TAKE.

When the output device finishes consuming the OUTPUT TAKE, the segmented INPUT TAKE$_{sub}$ is reconstituted by combining the first and second segments of INPUT TAKE$_{sub}$ in one of the storage buffers. Preferably, the smaller of the first and second segments is prepended or appended to the larger of the segments by copying the smaller segment to the appropriate location in the storage buffer containing the larger segment. Once reconstitution has been completed, INPUT TAKE$_{sub}$ (if no longer active) becomes available for use by the output device.

The present invention increases the processing capabilities of an imaging system by maximizing the time during which the RIPs and output devices of the imaging system remain active. In many imaging systems, for example, the RIPs and output devices remain active except during the reconstitution of an INPUT TAKE. However, if the reconstitution of an INPUT TAKE occurs during the downtime of the output device (e.g., for an imagesetter, during media movement, media punch, media cutting), system inactivity due to reconstitution is substantially eliminated.

The method and apparatus of the present Invention are preferably used in an imaging system network connecting multiple RIPs, output devices, and storage buffers. Several network configurations are presented in detail below.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
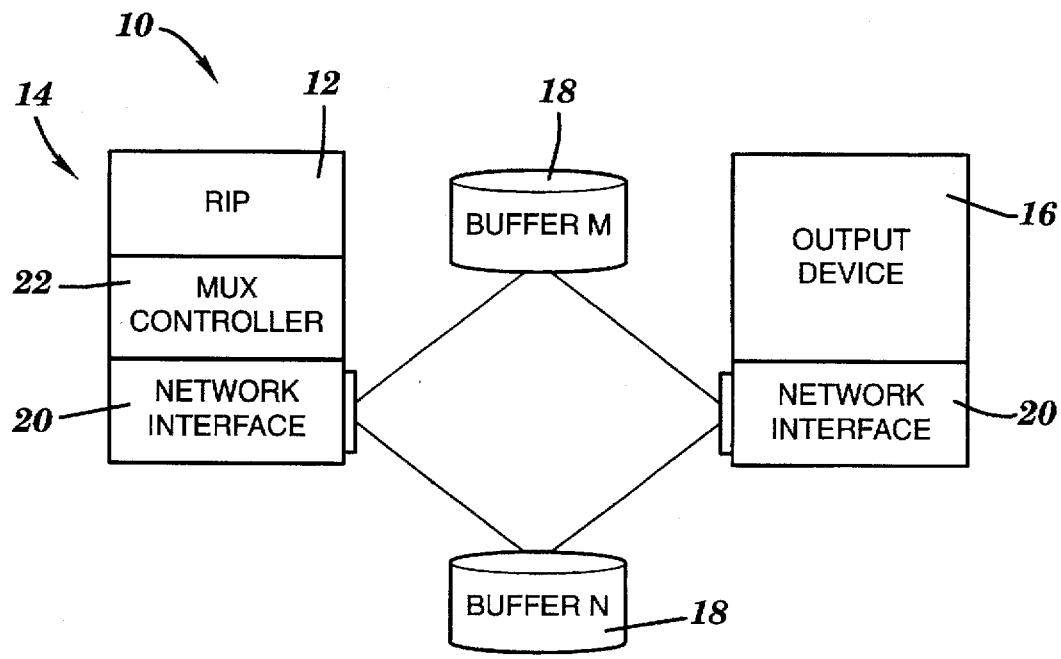
FIG. 1 illustrates a simple imaging system network including a software RIP, a MUX controller, a pair of storage buffers and a single output device, wherein the software RIP and MUX controller are operating on the same workstation.

Referring now specifically to the accompanying drawings, there are illustrated several embodiments of a multiplexing system for efficiently buffering data between at least one RIP and at least one output device in an imaging system, wherein like reference numerals refer to like elements throughout the drawings.

A simple imaging system network 10, incorporating the multiplexing system of the present invention, is illustrated in FIG. 1. The imaging system network 10 generally includes a RIP 12, such as the VIPER™ Software RIP available from the AGFA Division of Bayer Corporation, running on a POWER MACINTOSH™ workstation 14 from Apple Computer, Inc., and an output device 16, such as the SELECTSET AVANTRA 44™ large format imagesetter, again available from AGFA Division of Bayer Corporation.

The RIP 12 is connected to the output device 16 through a pair of storage buffers 18. Suitable network interfaces 20 are used to connect the RIP 12, storage buffers 18 and output device 16 in a network configuration. If necessary, depending upon hardware requirements and the like, appropriate converters (not shown) may be used to ensure data transfer compatibility between the components of the network. A MUX controller 22, in software form, is provided on the workstation 14. Of course, the MUX controller 22 may be coupled to the imaging system 10 through other nodes in the network.

Figure 2:
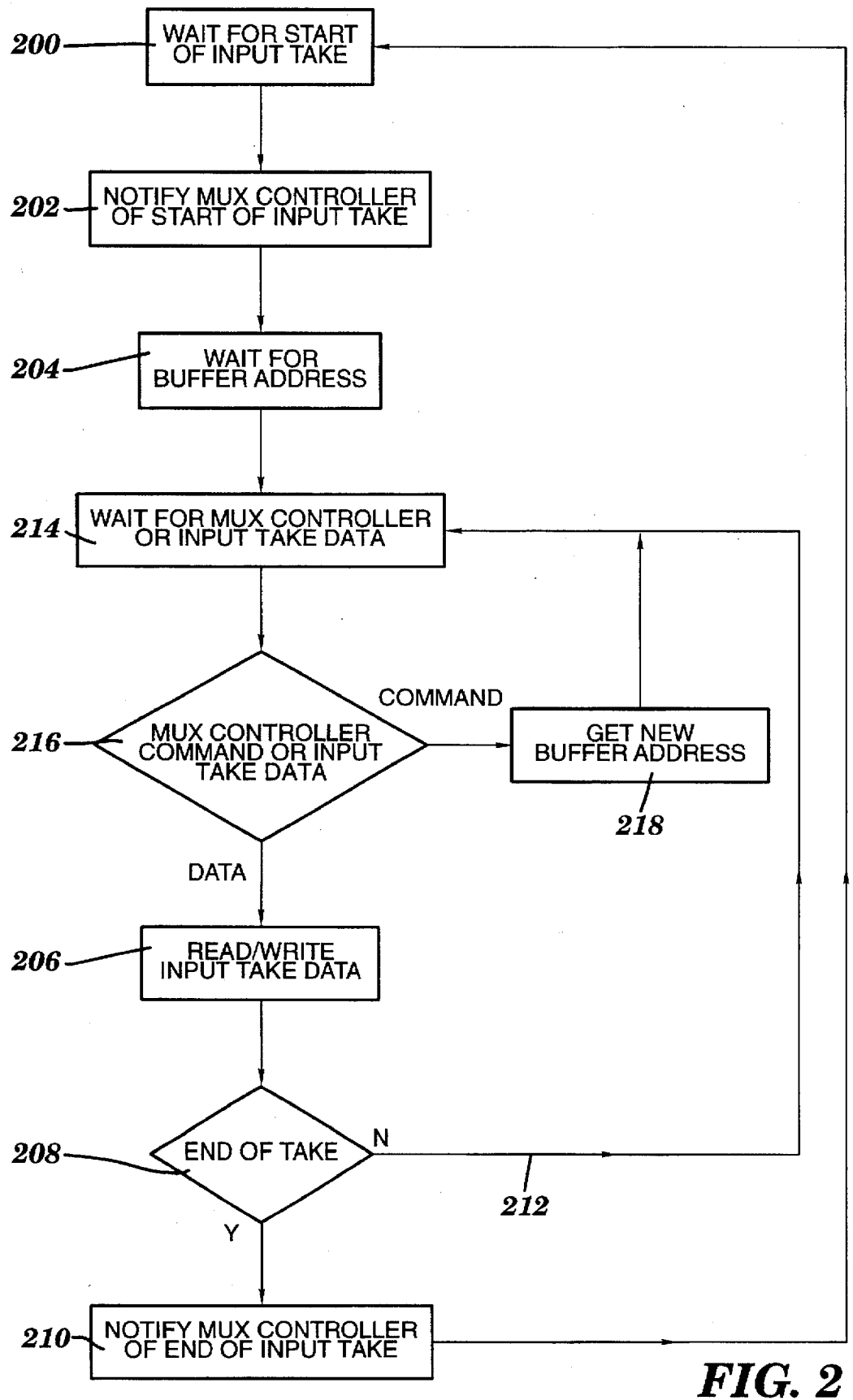
FIG. 2 is a flowchart illustrating the INPUT TAKE control loop in accordance with the present invention.
Figure 3:
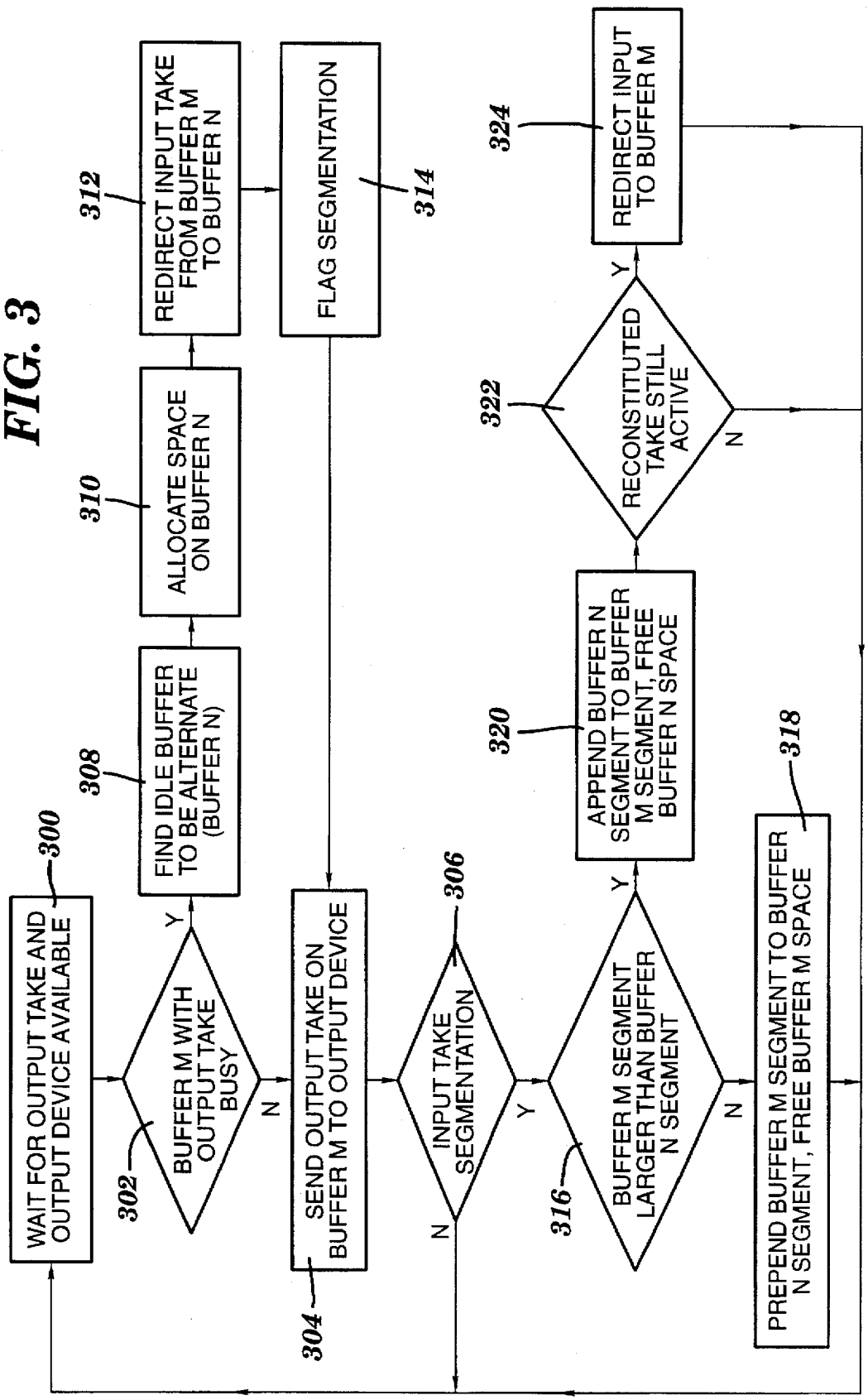
FIG. 3 is a flowchart illustrating the OUTPUT TAKE control loop in accordance with the present invention.
Figure 4:
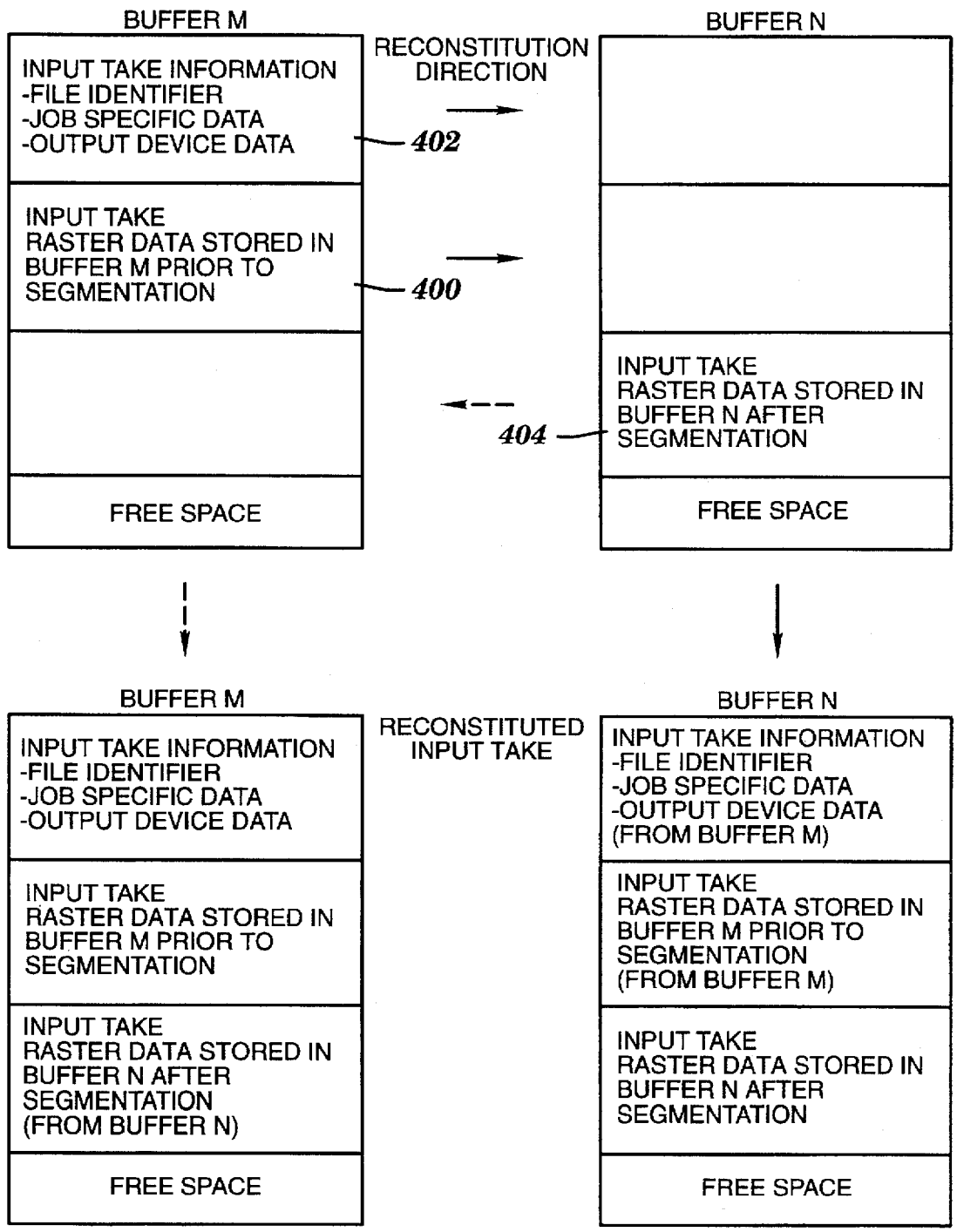
FIG. 4 illustrates the segmentation of an INPUT TAKE across a pair of storage buffers and the reconstitution process for combining the segments of the INPUT TAKE in one of the storage buffers.

The data buffering operation provided by the multiplexing system of the present invention is presented in detail in FIGS. 2, 3 and 4. Referring first to FIG. 2, there is illustrated the INPUT TAKE control loop for storing an INPUT TAKE on one or both of the storage buffers 18. In the following discussion, the storage buffers 18 are referenced as BUFFER M and BUFFER N.

In block 200, the system waits for the RIP 12 to supply an INPUT TAKE. When an INPUT TAKE is initiated by the RIP 12, the RIP 12 notifies the MUX controller 22 of the start of the INPUT TAKE (block 202). The MUX controller 22 allocates a block of memory in an idle one (BUFFER M) of the storage buffers 18 and sends the corresponding buffer address to the RIP 12 (block 204). If the output device 16 does not require an OUTPUT TAKE previously stored in BUFFER M, the entire INPUT TAKE is stored in BUFFER M starting at the given buffer address (block 206). When the complete INPUT TAKE has been stored (block 208), the RIP 12 notifies the MUX controller 22 of the end of the INPUT TAKE (block 210), wherein processing control returns to block 200.

Throughout the storage of the INPUT TAKE in BUFFER M, the MUX controller 22 monitors the output device 16 (loop 212 to block 214) to determine whether the output device 16 requires an OUTPUT TAKE previously stored in BUFFER M. If the output device 16 does require an OUTPUT TAKE previously stored in BUFFER M (block 216), the MUX controller 22 provides the RIP 12 with a new buffer address (block 218) designating a new memory location in BUFFER N. Upon receipt of the new buffer address, the RIP 12 stores the remaining segment of the INPUT TAKE in BUFFER N beginning at the new buffer address, thereby freeing BUFFER M and segmenting the INPUT TAKE across the pair of storage buffers 18. Advantageously, by using such a sedimentation process, the output device 16 is provided with a required OUTPUT TAKE in a substantially instantaneous manner, while the RIP 12 continues to produce and store imaging data without interruption.

The OUTPUT TAKE control loop for supplying an OUTPUT TAKE to the output device 16 is presented in FIG. 3. When an OUTPUT TAKE and the output device 16 are both available (block 300), the MUX controller 22 determines whether the storage buffer 18 containing the OUTPUT TAKE is busy receiving a subsequent INPUT TAKE from the RIP 12 (block 302). In this example, it is assumed that the OUTPUT TAKE is stored on BUFFER M. If BUFFER M is not busy receiving an INPUT TAKE (i.e., segmentation of the INPUT TAKE is not required), the MUX controller 22 directs the OUTPUT TAKE stored in BUFFER M to the output device 16 for further processing (block 304). Thereafter, since segmentation of the INPUT TAKE was not required (block 306), processing control returns to block 300.

If BUFFER M is busy receiving an INPUT TAKE (block 302), rendering it unavailable to the output device 16, the MUX controller 22 initiates a segmentation process wherein the segment of the INPUT TAKE not already stored on BUFFER M is stored on BUFFER N. Prior to the segmentation of the INPUT TAKE, the MUX controller 22 locates (block 308) an idle buffer (BUFFER N) and allocates space in BUFFER N (block 310) for the storage of the remaining segment of the INPUT TAKE. Thereafter, the MUX controller 22 redirects the storage of the INPUT TAKE from BUFFER M to BUFFER N (block 312) and sets a segmentation flag (block 314). Since the storage buffer 18 (BUFFER M) containing the OUTPUT TAKE is no longer busy receiving the INPUT TAKE, the OUTPUT TAKE is now available to the output device 16 (block 304).

If the segmentation flag has been set (block 306), the INPUT TAKE is reconstituted after the output device 16 has finished processing a previous OUTPUT TAKE. In accordance with the preferred embodiment of the present invention, the reconstitution process is dependent upon the relative sizes of the segments of the INPUT TAKE stored in BUFFER M and BUFFER N. Of course, other reconstitution methods may be utilized to join the segments of the INPUT TAKE without departing from the scope of the present invention.

In block 316, the MUX controller 22 determines whether the segment of the INPUT TAKE stored in BUFFER M prior to segmentation is larger than the segment of the INPUT TAKE stored in BUFFER N after segmentation. If the segment of the INPUT TAKE in BUFFER N is determined to be the larger segment, the MUX controller 22 prepends the segment of the INPUT TAKE stored in BUFFER M to the segment of the INPUT TAKE stored in BUFFER N (block 318), and frees the space in BUFFER M previously containing the INPUT TAKE segment. After the reconstitution of the INPUT TAKE, processing control returns to block 300. If the reconstituted INPUT TAKE is still active, i.e., still receiving data, the data is stored in BUFFER N until a complete OUTPUT TAKE is available to the output device 16.

If, again referring to block 316, the segment of the INPUT TAKE stored in BUFFER M is determined to be larger than the segment of the INPUT TAKE stored in BUFFER N, the MUX controller 22 appends the segment of the INPUT TAKE stored in BUFFER N to the segment stored in BUFFER M (block 320), and frees the space in BUFFER N where the INPUT TAKE segment was stored. If the reconstituted INPUT TAKE is no longer active (block 322), processing control returns to block 300 where the reconstituted INPUT TAKE becomes available to the output device 16 as an OUTPUT TAKE. If, however, the reconstituted INPUT TAKE is still active (block 322), any remaining data is redirected to BUFFER M (block 324). Thereafter, processing returns to block 300.

The reconstitution of a segmented INPUT TAKE is illustrated in greater detail in FIG. 4. In this example, an INPUT TAKE has been segmented between BUFFER M and BUFFER N, with a first segment 400 of the INPUT TAKE stored in BUFFER M and a second segment 404 of the INPUT TAKE stored in BUFFER N. In addition, information 402 specific to the INPUT TAKE (e.g., file identifier, job and output device data) is stored together with the first segment 400. If the combination of the first segment 400 and the information 402 is smaller than the second segment 404 (block 316, FIG. 3), the first segment 400 and information 402 are prepended to the second segment 404 as indicated by the solid directional arrows. Similarly, if the combination of the first segment 400 and the information 402 is larger than the second segment 404, the second segment 404 is appended to the first segment 402 as indicated by the dashed directional arrows.

Figure 5:
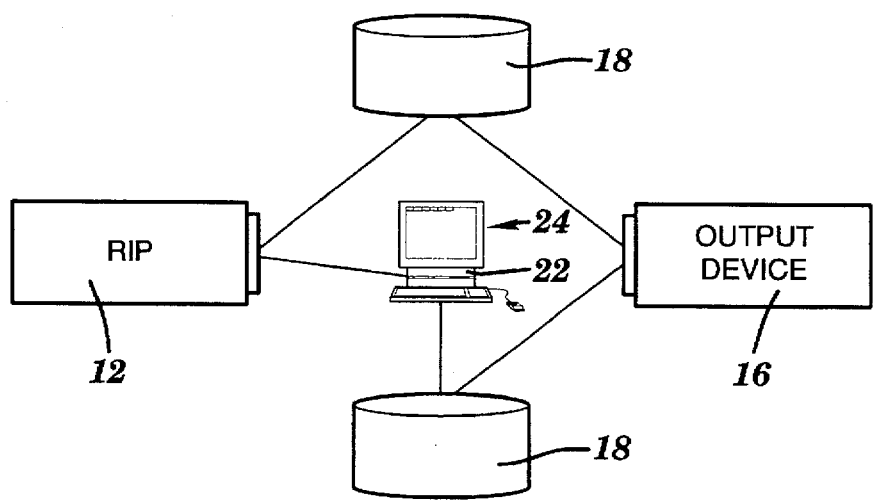
FIG. 5 illustrates an imaging system including a single RIP (hardware or software), a MUX controller, a pair of storage buffers and a single output device, wherein the MUX controller is operating on a stand-alone workstation.

The multiplexing system of the present invention may be used to efficiently buffer data in a wide variety of imaging systems. For example, as illustrated in FIG. 5, the imaging system may include a single RIP 12, a MUX controller 22 operating on a stand-alone workstation 24, a pair of storage buffers 18, and a single output device 16. The RIP may be a software RIP as described above, or may be a hardware RIP such as the STAR™ series of hardware RIPs available from the AGFA Division of Bayer Corporation. In this and other imaging systems described below, the system components are arranged in a network configuration using appropriate network interfaces (not shown).

Figure 6:
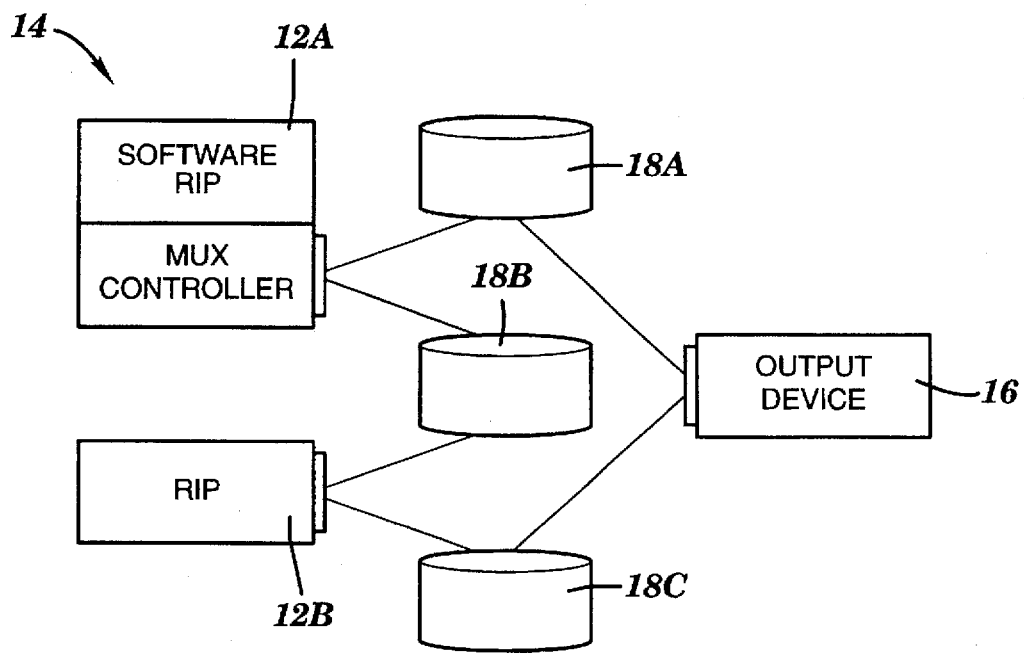
FIGS. 6 and 7 illustrate imaging systems incorporating a pair of RIPs, a single output device, and a MUX controller for efficiently buffering imaging data between the RIPs and output device through a plurality of storage buffers.
Figure 7:
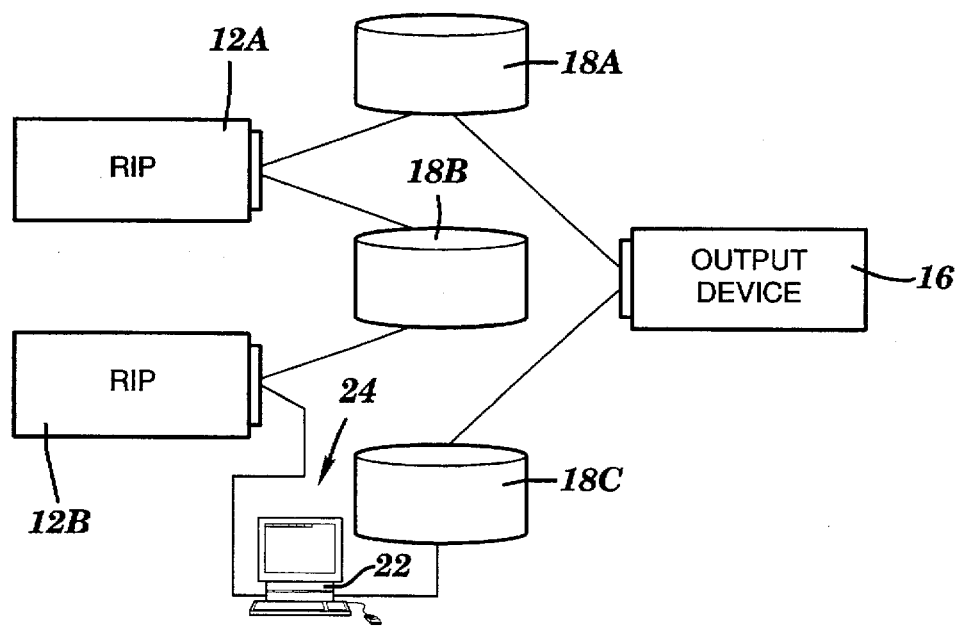

Two imaging systems, each incorporating a pair of RIPs and a single output device, are illustrated in FIGS. 6 and 7. Referring first to FIG. 6, there is illustrated an imaging system wherein a software RIP 12A and a hardware RIP 12B are used to produce INPUT TAKE data for output (i.e., as an OUTPUT TAKE) to a single output device 16. In this example, the software RIP 12A and the MUX controller 22 are running on the same workstation 14. To implement the data buffering operation described above with regard to FIGS. 2–4, thereby efficiently buffering imaging data between the RIPs and the output device, each RIP 12A and 12B, regardless of type, is provided with access to a pair of storage buffers. Specifically, the software RIP 12A stores INPUT TAKE data on storage buffers 18A and 18B, while the hardware RIP 12B stores INPUT TAKE data on storage buffers 18B and 18C. In this configuration, the RIPS 12A and 12B share a storage buffer 18B to reduce the number of storage buffers required by the imaging system. Of course, it should be readily apparent that each RIP 12A and 12B may each be independently provided with a pair of storage buffers. A similar imaging system, incorporating a pair of RIPs 12A and 12B (software and/or hardware) and a single output device 16, is illustrated in FIG. 7. Unlike the configuration illustrated in FIG. 6, however, the MUX controller 22 operates on a stand-alone workstation 24 to control the data buffering operation through the storage buffers 18 (A–C).

Figure 8:
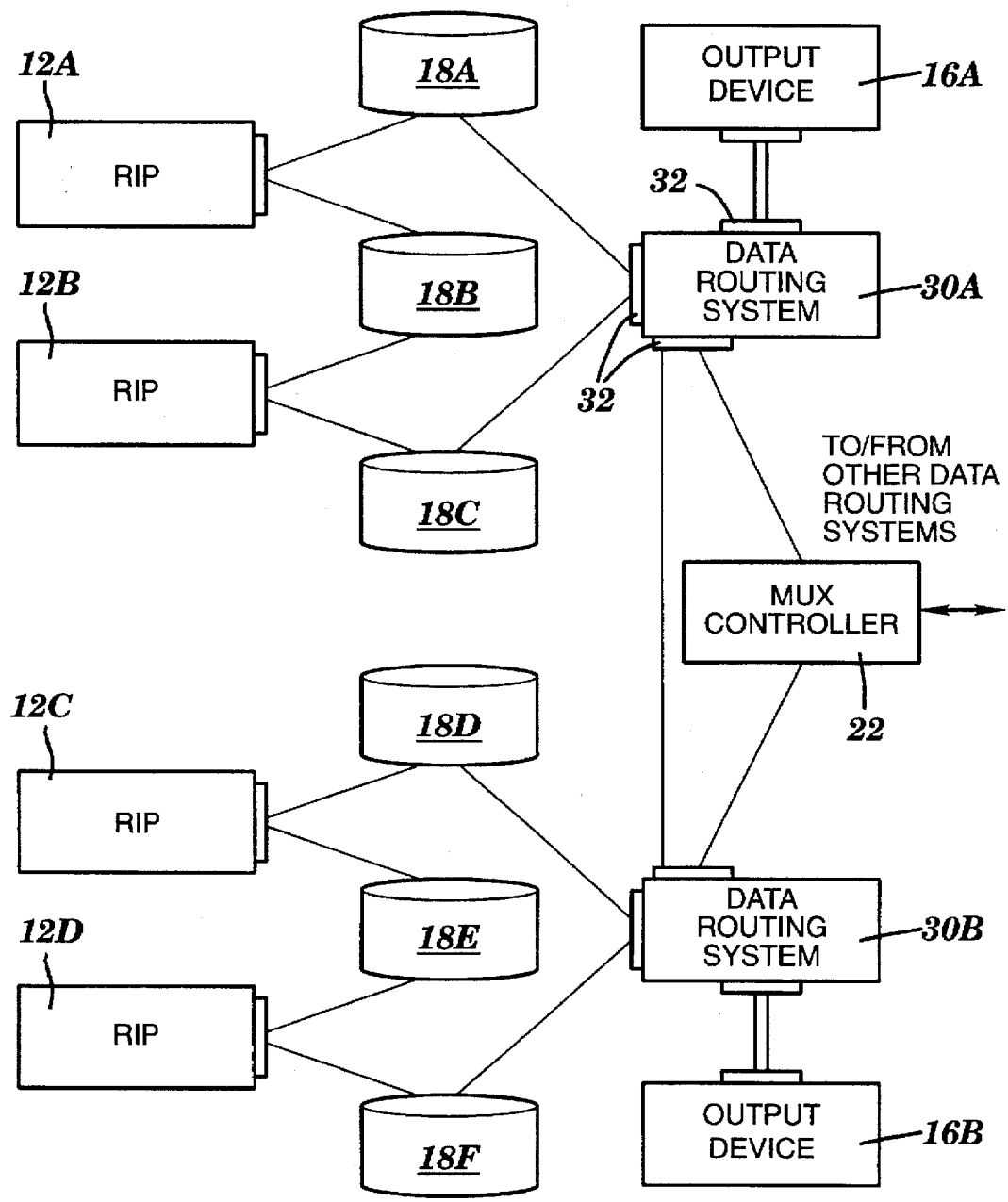
FIGS. 8 and 9 illustrate imaging systems including multiple RIPs and multiple output devices.

A more complex imaging system having a plurality of RIPs and a plurality of output devices is presented in FIG. 8. As in the previous examples, a pair of storage buffers are used in conjunction with each RIP to transfer imaging data, under the direction of the MUX controller 22, from the RIP to an output device so that the RIPs and output devices of the imaging system are kept busy producing and consuming imaging data, respectively. Preferably, the data buffering operation described above with regard to FIGS. 2–4 is used to efficiently transfer imaging data through the imaging system of FIG. 8.

In the imaging system shown in FIG. 8, imaging (INPUT TAKE) data is produced by a plurality of software and/or hardware RIPs 12A, 12B, 12C and 12D. In operation, RIP 12A stores INPUT TAKE data on storage buffers 18A and 18B, RIP 12B stores INPUT TAKE data on storage buffers 18B and 18C, RIP 12C stores INPUT TAKE data on storage buffers 18D and 18E, and RIP 12D stores INPUT TAKE data on storage buffers 18E and 18F. As shown, several of the storage buffers, namely storage buffers 18B and 18E, are shared by two RIPs.

A plurality of data routing systems 30A and 30B (only two of which are shown), each including a plurality of ports 32, are used to direct data and control information to/from any node on the network in response to instructions provided by the MUX controller 22. For example, an OUTPUT TAKE produced by RIP 12A and stored on storage buffer 18b may be directed through data routing systems 30A and 30B for output on output device 16b. As should be readily apparent, many disparate data paths are possible in this system. The routing control information used by the MUX controller 22 to efficiently buffer data between the plurality of RIPs and the plurality of output devices is provided in part by the INPUT TAKE information 402 (see FIG. 4) stored in conjunction with the INPUT TAKE raster data.

Figure 9:
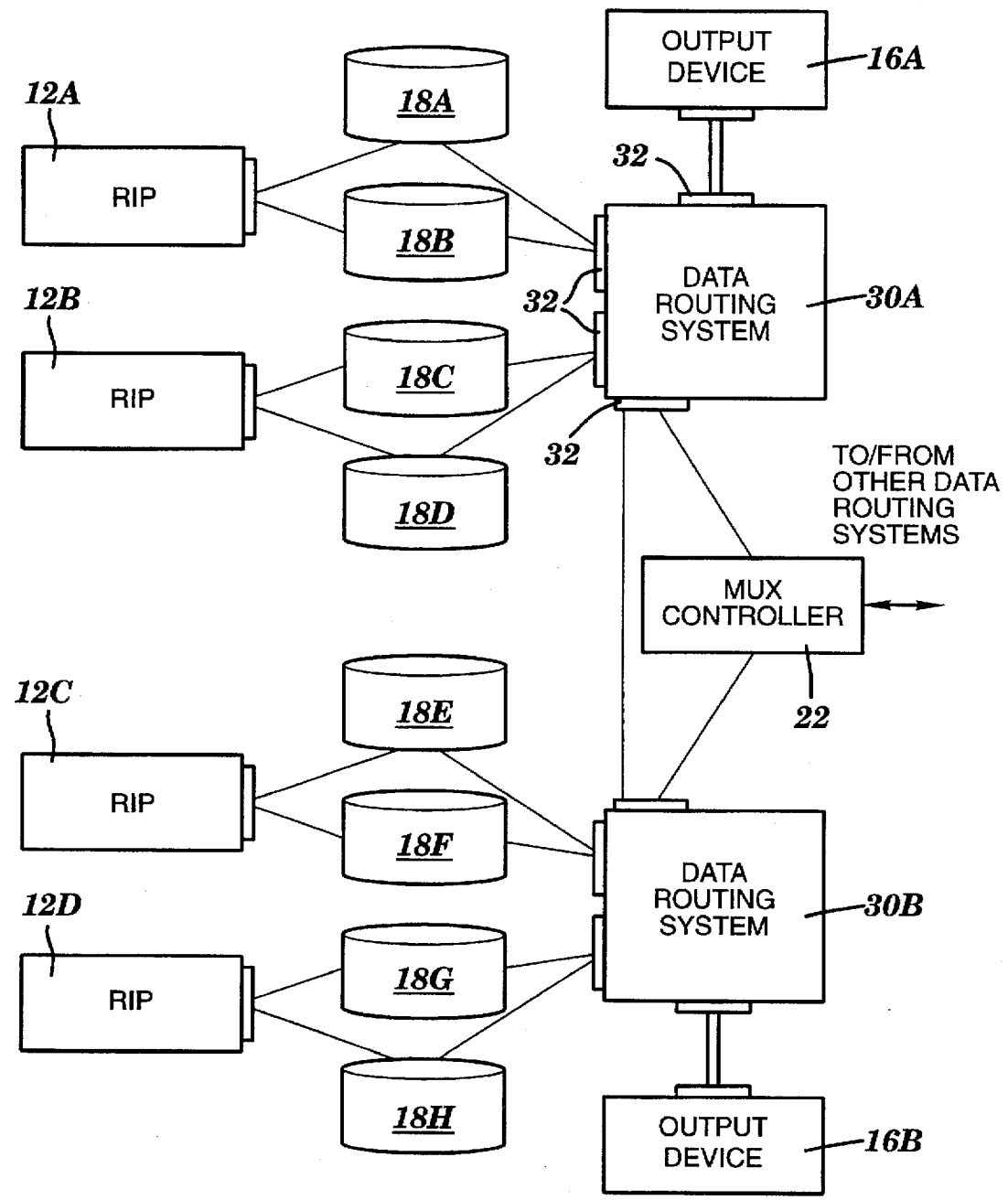

A second, substantially similar embodiment of an imaging system including multiple RIPs and multiple output devices is illustrated in FIG. 9. Unlike the configuration of FIG. 8, however, each RIP 12A, 12B, 12C and 12D is provided with a pair of dedicated storage buffers 18(A–B), 18(C–D), 18(E–F) and 18(G–H), respectively. Again, a plurality of data routing systems 30A and 30B are used to direct data and control information to/from any node on the network in response to instructions provided by the MUX controller 22.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. In an imaging system including a raster image processor (RIP) for producing imaging data, an output device for consuming imaging data produced by said RIP, and a plurality of storage buffers, a data buffering method comprising the steps of:

storing a first supply of imaging data produced by said RIP on a first one of said storage buffers;

determining, during said storing step, if said output device requires a second supply of imaging data produced by said RIP and previously stored on said first storage buffer; and segmenting said first supply of imaging data between said first storage buffer and a second one of said storage buffers of said output device requires said second supply of imaging data previously stored on said first storage buffer, and outputting said second supply of imaging data to said output device.

2. The data buffering method according to claim 1, wherein said segmenting step further includes the step of:

redirecting the storage of said first supply of imaging data from said first storage buffer to said second storage buffer, wherein a first segment of said first supply of imaging data is stored in said first storage buffer prior to said segmenting step and a second segment of said first supply of imaging data is stored in said second storage buffer after said segmenting step.

3. The data buffering method according to claim 2, further including the step of:

combining said first and second segments in one of said storage buffers to reconstitute said first supply of imaging data.

4. The data buffering method according to claim 3, wherein said combining step further includes the step of:

combining said first and second segments in one of said first or second storage buffers.

5. The data buffering method according to claim 4, wherein said step of combining said first and second segments in one of said first or second storage buffers further includes the steps of:

determining whether said first segment is larger than said second segment;

copying said first segment from said first storage buffer to said second storage buffer if said first segment is smaller than the second segment; and copying said second segment from said second storage buffer to said first storage buffer if said second segment is smaller than said first segment.

6. The data buffering method according to claim 5, wherein said first segment copying step further includes the step of:

prepending said first segment to said second segment in said second storage buffer.

7. The data buffering method according to claim 5, wherein said second segment copying step further includes the step of:

appending said second segment to said first segment in said first storage buffer.

8. In an imaging system including a plurality of raster image processors (RIPs) for producing imaging data, an output device for consuming imaging data produced by said RIPs, and a plurality of storage buffers, a data buffering method comprising the steps of:

storing a first supply of imaging data produced by one of said of RIPs on a first one of said storage buffers;

determining, during said storing step, if said output device requires a second supply of imaging data produced by one of said RIPs and previously stored on said first storage buffer; and segmenting said first supply of imaging data between said first storage buffer and a second one of said storage buffers if said output device requires said second supply of imaging data previously stored on said first storage buffer, and outputting said second supply of imaging data to said output device.

9. The data buffering method according to claim 8, wherein said segmenting step further includes the step of:

redirecting the storage of said first supply of imaging data from said first storage buffer to said second storage buffer, wherein a first segment of said first supply of imaging data is stored in said first storage buffer prior to said segmenting step and a second segment of said first supply of imaging data is stored in said second storage buffer after said segmenting step.

10. The data buffering method according to claim 9, further including the step of combining said first and second segments in one of said storage buffers to reconstitute said first supply of imaging data.

11. The data buffering method according to claim 10, wherein said combining step further includes the step of:

combining said first and second segments in one of said first or second storage buffers.

12. The data buffering method according to claim 11, wherein said step of combining said first and second segments in one of said first or second storage buffers further includes the steps of determining whether said first segment is larger than said second segment;

copying said first segment to said second storage buffer if said first segment is smaller than the second segment; and copying said second segment to said first storage buffer if said second segment is smaller than said first segment.

13. The data buffering method according to claim 12, wherein said first segment copying step further includes the step of:

prepending said first segment to said second segment in said second storage buffer.

14. The data buffering method according to claim 12, wherein said second segment copying step further includes the step of:

appending said second segment to said first segment in said first storage buffer.

15. In an imaging system including a plurality of raster image processors (RIPs) for producing imaging data, a plurality of output devices for consuming imaging data produced by said RIPs, and a plurality of storage buffers, a data buffering method comprising the steps of storing a first supply of imaging data produced by one of said of RIPs on a first one of said storage buffers;

determining, during said storing step, if one of said output devices requires a second supply of imaging data produced by one of said RIPs and previously stored on said first storage buffer; and segmenting said first supply of imaging data between said first storage buffer and a second one of said storage buffers if said one of said output devices requires said second supply of imaging data previously stored on said first storage buffer, and outputting said second supply of imaging data to said one of said output devices.

16. The data buffering method according to claim 15, wherein said segmenting step further includes the step of:

redirecting the storage of said first supply of imaging data from said first storage buffer to said second storage buffer, wherein a first segment of said first supply of imaging data is stored in said first storage buffer prior to said segmenting step and a second segment of said first supply of imaging data is stored in said second storage buffer after said segmenting step.

17. The data buffering method according to claim 16, further including the step of:

combining said first and second segments in one of said storage buffers to reconstitute said first supply of imaging data.

18. The data buffering method according to claim 17, wherein said combining step further includes the step of:

combining said first and second segments in one of said first or second storage buffers.

19. The data buffering method according to claim 18, wherein said combining step further includes the steps of:

determining whether said first segment is larger than said second segment;

copying said first segment to said second storage buffer if said first segment is smaller than the second segment; and copying said second segment to said first storage buffer if said second segment is smaller than said first segment.

20. The data buffering method according to claim 19, wherein said first segment copying step further includes the step of:

prepending said first segment to said second segment in said second storage buffer.

21. The data buffering method according to claim 19, wherein said second segment copying step further includes the step of:

appending said second segment to said first segment in said first storage buffer.

* * * * *